(No Model.) 2 Sheets—Sheet 1.

W. ZERMAN.
INSERTIBLE SAW TOOTH.

No. 274,876. Patented Mar. 27, 1883.

WITNESSES:
Thomas Dugan
James F. Tobin

INVENTOR:
William Zerman
by his Attorneys
Howson & Sons (No Model.) 2 Sheets—Sheet 2.
W. ZERMAN.
INSERTIBLE SAW TOOTH.
No. 274,876. Patented Mar. 27, 1883.
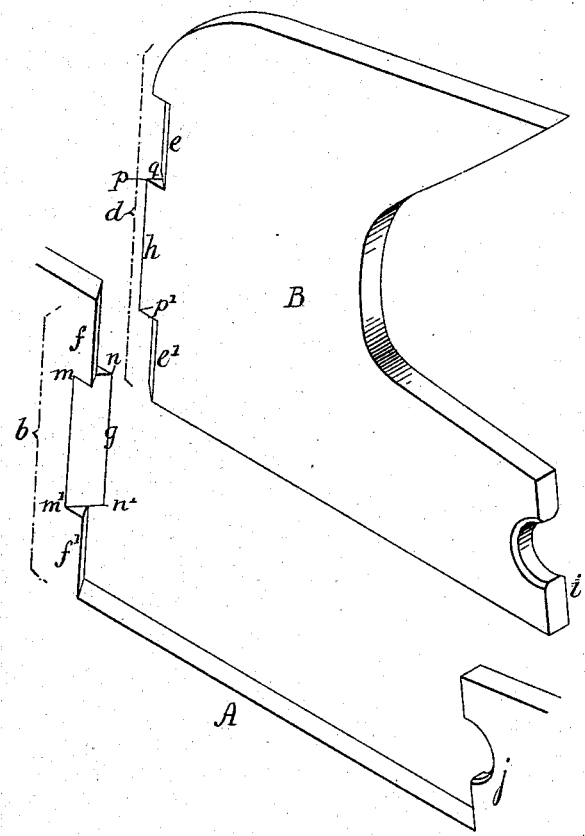
FIG. 6.
FIG. 7.
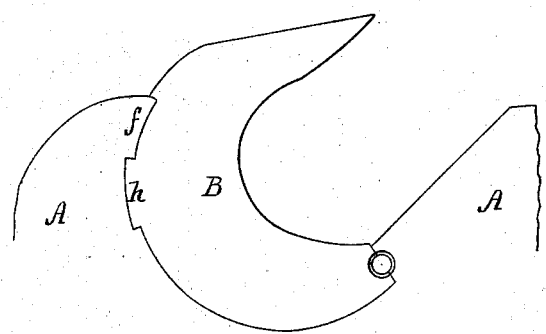
WITNESSES:
Thomas Dugan
James T. Tobins
INVENTOR:
William Zerman
by his Attorneys
Howson & Son

UNITED STATES PATENT OFFICE.

WILLIAM ZERMAN, OF TRENTON, NEW JERSEY.

INSERTIBLE SAW-TOOTH.

SPECIFICATION forming part of Letters Patent No. 274,876, dated March 27, 1883.

Application filed January 17, 1883. (No model.)

*To all whom it may concern:*

Be it known that I, WILLIAM ZERMAN, a citizen of the United States, and a resident of Trenton, Mercer county, New Jersey, have invented certain Improvements in Saws and Insertible Teeth therefor, of which the following is a specification.

My invention consists of certain improvements, fully described hereinafter, in saws and insertible teeth therefor, the object of my invention being to afford the means of readily inserting a tooth into a recess by adjusting the rear edge of the former to the rear edge of the latter while the tooth is in an inclined position in respect to the blade, and then moving the outer end of the tooth laterally into the recess until it coincides with the blade, thereby obviating the necessity of resorting to the common plan of driving or otherwise forcibly introducing teeth into recesses of a blade.

Figure 1:
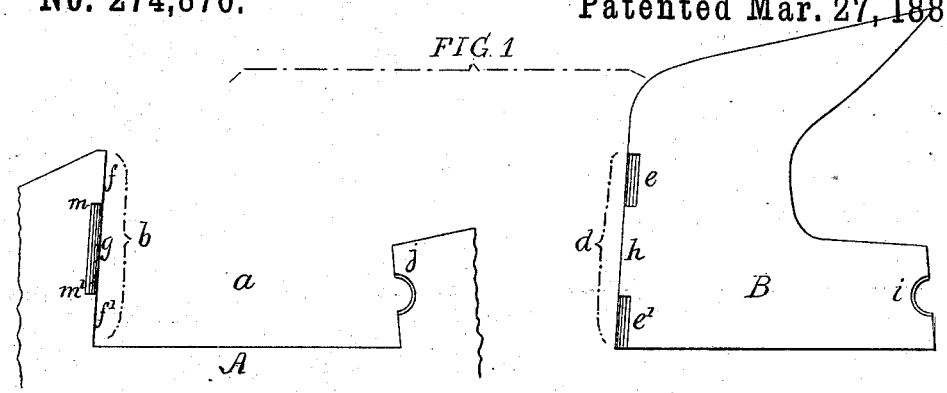
Figure 2:
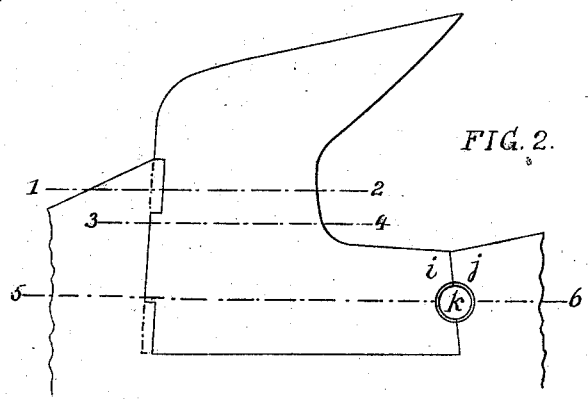
Figure 3:
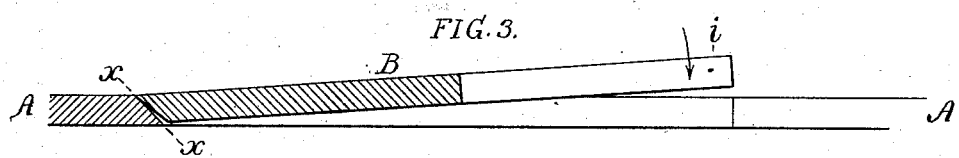
Figure 4:
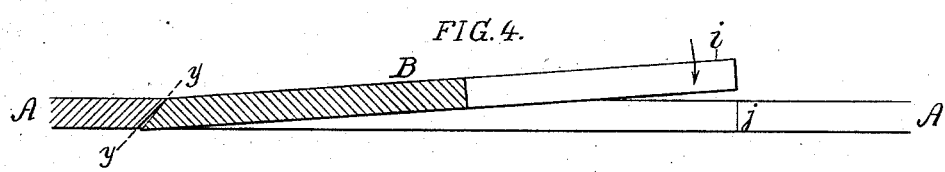
Figure 5:
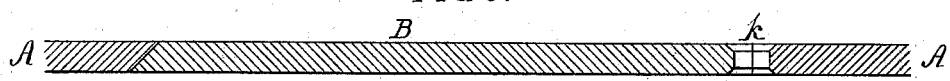

In the accompanying drawings, Figure 1, Sheet 1, is a side view of part of a saw-blade and a tooth detached therefrom; Fig. 2, a side view showing the tooth fitted to its place in the blade; Fig. 3, a section on the line 1 2, Fig. 2, showing the manner of inserting the tooth into the recess of the blade; Fig. 4, a section on the line 3 4, with the tooth in the same position as in Fig. 3; Fig. 5, a section on the line 5 6, showing the tooth inserted into the blade; Fig. 6, Sheet 2, a perspective view of the tooth and part of the blade; and Fig. 7, a side view, illustrating my invention as applied to a saw-tooth differing in shape from that illustrated in the other figures. Figs. 3, 4, 5, and 6 are on a larger scale than Figs. 1, 2, and 7.

Omitting all reference to Fig. 7 for the present, A represents part of the blade of a circular saw, and B one of the detachable teeth, $a$ being the recess in the blade for receiving the base of the tooth.

The portions $f f'$ of the rear edge, $b$, of the recess are beveled in the direction indicated by the dotted line $x x$ in the enlarged view, Fig. 3, from one face of the blade to the opposite face, and the intermediate portion, $g$, of the said rear edge of the recess is beveled in a contrary direction—that is, on the line $y y$, Fig. 4, triangular shoulders $m m'$ appearing on the front side of the blade where the portions $f$ and $f'$ meet the central portion, and similar shoulders, $n n'$, appearing on the opposite side of the blade, as best observed in the perspective view, Fig. 6.

The rear edge, $d$, of the tooth B is made to correspond with and fit accurately to the above-described rear edge of the recess in the blade, the said edge of the tooth having notches or recesses $e e'$, beveled to accord with the bevels of the portions $f f'$ of the rear edge of the recess in the blade, and the intermediate portion, $h$, of the rear edge of the tooth being beveled to accord with the bevel of the intermediate portion, $g$, of the rear edge of the recess.

By beveling the rear edge of the tooth, triangular shoulders are formed thereon similar to those on the rear edge of the recess, and the latter shoulders are arranged to interlock with those on the edge of the tooth.

In adjusting the tooth to its place it is first held in the inclined position shown in Fig. 3 in respect to the blade, the base of the tooth bearing on the bottom of the recess in the blade, and the shoulders on the edge of the blade interlocking with those of the tooth, after which the outer end, $i$, of the tooth is pushed in the direction of the arrow until it coincides with and fits snugly against the end $j$ of the recess, when the tooth will be locked in its place, and may be retained therein by a rivet passed through a hole, $k$, made partly in the blade and partly in the tooth. There is no strain on the rivet, however, for the front end of the recess and front of the tooth are so inclined that when the saw is in action the force exerted to raise the outer end of the tooth from its position in the blade will be effectually resisted by the latter, while all displacement of the rear end of the tooth is prevented by the interlocking shoulders and by the beveling above described.

My invention is not restricted to teeth and recesses of the form shown in Figs. 1 and 2. For instance, in Fig. 7 I have shown a circular-saw tooth with my improved fastening, the invention being equally applicable to either circular or straight backed saws.

One of the advantages of my invention is the facility with which the tooth can be adjusted to its place in the blade and detached therefrom after removing the rivet; and another and important advantage is, that if the tooth is accurately fitted it can be introduced into its place without that tension and warping of the saw-blade which take place where insertible teeth are driven or otherwise forcibly introduced into recesses in the blade.

The saw can be manufactured more cheaply than those having ribs on the edge of the recess in the saw adapted to grooves in the edge of the tooth, as the labor necessary in preparing the saw and teeth for being fitted together is much reduced.

I claim as my invention—

1. The within-described insertible and detachable saw-tooth, the same having, at the rear, portions beveled in contrary directions and presenting the within-described shoulders, adapted to corresponding beveled portions and shoulders on the rear edge of a recess in a saw-blade, all substantially as described.

2. The combination of a saw-blade having recesses, the rear edge of each of which has portions beveled in contrary directions, and shoulders $m\ m'$, with an insertible tooth having at its rear edge corresponding beveled portions and shoulders adapted to interlock with those on the edge of the recess, substantially as specified.

3. The combination of a saw-blade having recesses, the rear edge of each of which has beveled portions and shoulders, substantially as described, and inclined front end, with a tooth having a rear edge, constructed to fit and interlock with the said rear edge of the recess, and having a front edge inclined to correspond with the inclined end of the recess, substantially as described.

In testimony whereof I have signed my name to this specification in the presence of two subscribing witnesses.

W. ZERMAN.

Witnesses:
 THOMAS DUGAN,
 HARRY SMITH.